(12) United States Patent
Greene, Jr. et al.

(10) Patent No.: US 6,630,988 B2
(45) Date of Patent: Oct. 7, 2003

(54) RETICLE STOP BLOCK APPARATUS AND METHOD

(75) Inventors: Daniel Lawson Greene, Jr., Worcester, MA (US); Ron Sinicki, Newberg, OR (US); Kurt Woolley, South Jordan, UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/894,482

(22) Filed: Jun. 28, 2001

(65) Prior Publication Data

US 2003/0002025 A1 Jan. 2, 2003

(51) Int. Cl.[7] .................. G03B 27/62; G03B 27/64; B65G 49/07
(52) U.S. Cl. ..................... 355/75; 355/76; 414/935
(58) Field of Search .................... 355/53, 75, 76; 414/935

(56) References Cited

U.S. PATENT DOCUMENTS

| | | | | | |
|---|---|---|---|---|---|
| 4,716,299 A | * | 12/1987 | Tanaka et al. | ......... | 250/559.01 |
| 5,164,974 A | * | 11/1992 | Kariya et al. | ......... | 378/34 |
| 5,746,565 A | * | 5/1998 | Tepolt | ......... | 414/744.5 |
| 5,842,824 A | * | 12/1998 | Nishi | ......... | 414/225.01 |
| 5,980,187 A | * | 11/1999 | Verhovsky | ......... | 294/103.1 |
| 6,414,744 B1 | * | 7/2002 | Kuiper et al. | ......... | 355/75 |
| 6,419,439 B2 | * | 7/2002 | Schlehahn et al. | ......... | 414/934 |

* cited by examiner

Primary Examiner—Russell Adams
Assistant Examiner—D. Ben Esplin
(74) Attorney, Agent, or Firm—Schwegman, Lundberg, Woessner & Kluth, P.A.

(57) ABSTRACT

Methods and apparatus for ensuring the proper handling of reticles in the manufacturing of microdevices are disclosed. The methods and apparatus employ one or more reticle stop blocks fixed to a reticle handling arm. The one or more reticle stop blocks are designed and arranged to engage an edge of the reticle in order to place the reticle in a desired position on the reticle handling arm should the reticle be improperly arranged in a cassette in which the reticle is stored. By ensuring proper placement of the reticle on the reticle handling arm when the reticle is removed from the cassette, the likelihood of a subsequent fault in handling the reticle is greatly reduced.

17 Claims, 5 Drawing Sheets

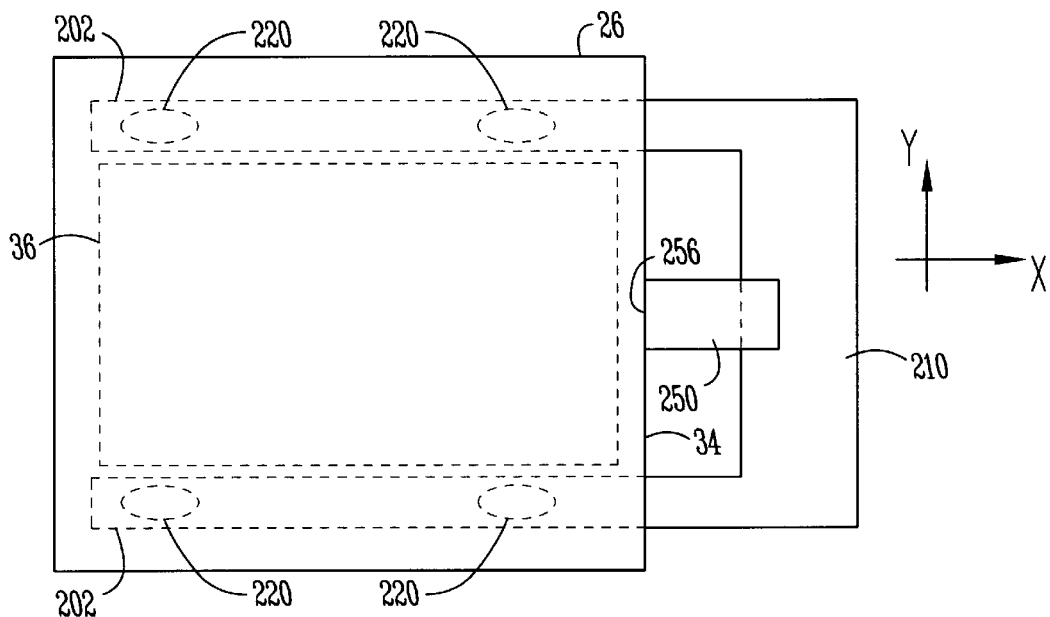
Fig. 3C
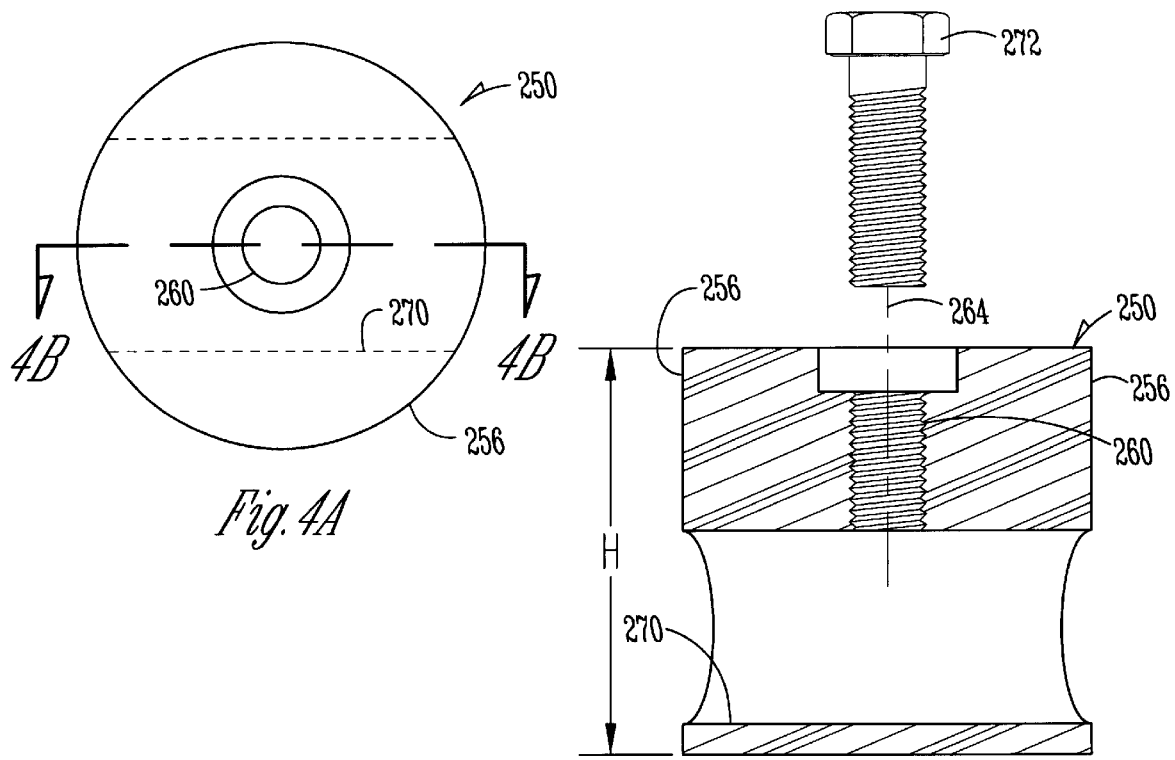
Fig. 4A
Fig. 4B

RETICLE STOP BLOCK APPARATUS AND METHOD

FIELD OF THE INVENTION

The present invention relates to photolithography, and in particular to methods and apparatus for ensuring proper handling of reticles in photolithography systems.

BACKGROUND OF THE INVENTION

The manufacture of certain types of microdevices, such as semiconductor integrated circuits, flat-panel displays, ink-jet heads and the like, involves the process of photolithography and hence the use of photolithography systems, also called "photolithography tools." Photolithography tools are designed to project an image of a finely patterned mask ("reticle") onto a photosensitive substrate. The reticle typically includes a pellicle, which is a thin membrane displaced from the patterned side of the reticle by a frame. The pellicle serves to keep dust and other particulates off of the patterned surface that would otherwise be imaged onto the substrate. After the substrate is exposed, it is processed to create a desired structure based on the imaged pattern.

The manufacturing process typically involves repeating the photolithography and process steps using different reticles in order to build up the device. Accordingly, photolithography tools typically include (or are operatively coupled with) an automatic reticle handling system to facilitate the rapid loading and unloading of reticles to and from the tool.

Reticles are fragile and thus are always contained inside a protective plastic case called a "cassette" until extracted by the reticle handling system. In the reticle handling operation, multiple reticles in their respective cassettes are manually loaded into a reticle library within the photolithography tool. A first reticle handler then inserts a reticle handling arm into a particular cassette to engage the reticle therein. Once engaged, the reticle is then transferred to a second reticle handler, which aligns and delivers the reticle to another location, such as a reticle stage or a pellicle inspection station (e.g., a pellicle particle detector or "PPD") within the photolithography tool.

In many photolithography tools, successful transfer of a reticle from the cassette into its proper position in the tool requires that the reticle be properly positioned on the first reticle handler. Otherwise, the transfer ("handoff") between the first and second reticle handlers can be faulty.

FIG. 1 illustrates a prior art reticle handling system that includes a reticle handling arm 2 that is part of a first reticle handler. The reticle handling arm is in communication with a reticle carrier 4 that is part of a second reticle handler. Reticle carrier 4 includes translatable lifting brackets 6 that are adapted to engage a reticle 8 residing on reticle arm 2 and to lift the reticle from the reticle handling arm.

If the reticle is not properly positioned on the reticle handling arm, the lifting brackets can jam against the reticle, as shown, when attempting to engage the reticle. This can damage the reticle and/or the reticle handling arm, and/or can jam the reticle handling system, thereby causing a system failure.

The consequences of faulty reticle handling can be financially serious. A jammed reticle stops production, requires expert man-hours to repair, and can damage the reticle handling system and/or the reticle itself. Reticles are relatively expensive, so that having to replace a reticle damaged by faulty handling adds cost to the manufacturing process. Accordingly, it is important in microdevice manufacturing to take appropriate steps to ensure that the likelihood of reticle handling faults is minimized.

BRIEF DESCRIPTION OF THE DRAWINGS

FIG. 3C is a plan view similar to that of FIG. 3A, but showing another example embodiment of the present invention comprising a single reticle stop block attached to the base portion of the reticle handling arm;

FIG. 4A is a plan view of a reticle stop block as shown in FIG. 3A illustrating an example embodiment of a reticle stop block that slides over a support arm of the reticle handling arm and that can be fixed to the support arm using a set screw;

FIG. 4B is a cross-sectional view of the reticle stop block of FIG. 4A;

DETAILED DESCRIPTION OF THE INVENTION

The present invention relates to photolithography, and in particular to methods and apparatus for ensuring proper handling of reticles in photolithography systems.

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 2A:
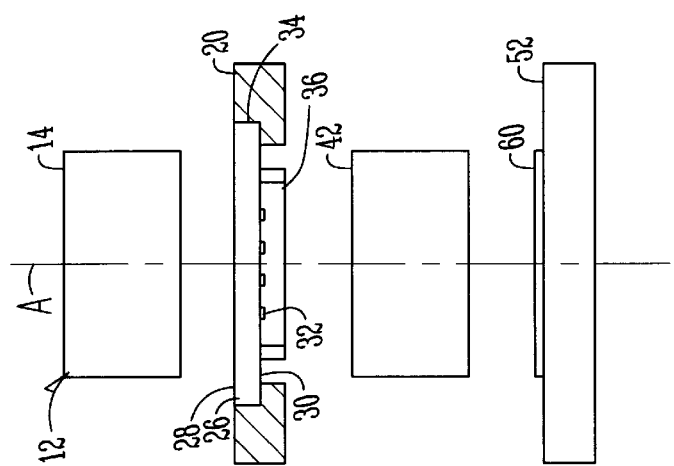
FIG. 2A is a schematic block diagram of a photolithography tool in combination with a reticle handling system according to the present invention that includes a reticle library, a first reticle handler, and a second reticle handler.

With reference now to FIG. 2A, there is shown a photolithography tool 12 that includes, in order along an axis A, an illumination system 14 and a reticle stage 20 adapted to support a reticle 26 so that it can receive illumination from the illumination system. Reticle 26 includes an upper surface 28, a lower surface 30 with a pattern 32 formed thereon, and edges 34. Reticle 26 is, in an example embodiment, made of glass, such as quartz or fused silica. Pattern 32, in exemplary embodiments, is opaque and made of chrome, a transparent dielectric, or a combination of the two. Reticle 26 typically includes a pellicle 36 arranged adjacent lower surface 30 and covering (but displaced from) pattern 32. Pellicle 36 is typically formed by stretching an optically neutral polymer over a frame.

Further included in photolithography tool 12 along axis A is a projection lens 42, and a substrate stage 52 that supports a substrate 60 to be processed. Substrate stage 52 supports substrate 60 such that an image of pattern 32 is formed on the the substrate during illumination of the reticle.

Figure 2B:
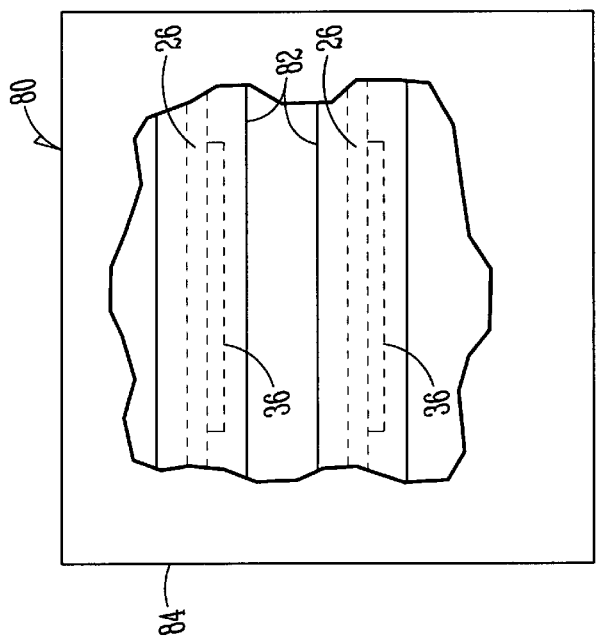
FIG. 2B is a close-up cut-away side view of the reticle library of FIG. 2A showing two of the plurality of cassettes stored in the library, with a reticle in each of the shown cassettes.

With continuing reference to FIG. 2A and also to FIG. 2B, operatively coupled to photolithography tool 12 is a reticle handing system 70 that includes a reticle library 80 that is capable of containing a plurality of cassettes 82 each of which contains a reticle 26. In an exemplary embodiment of the present invention, reticle library 80 is within photolithography tool 12. Reticle library 80 includes an open (or openable) side 84 that allows access to cassettes 82 and reticles 26.

Reticle handling system 70 also includes a first reticle handler 86 in operative communication with reticle library 80 to engage and receive reticles stored therein, and a second reticle handler 90 in operative communication with the first reticle handler and reticle stage 20 to engage and receive reticles on the first reticle handler and deliver them to the reticle stage or another location. For example, in addition to reticle handling system 70, an inspection station 96 may be provided so that reticle 26 can be transferred thereto by second reticle handler 90 and inspected prior to being transferred to photolithography tool 12 and reticle stage 20. Inspection station 96 may be, for example, a pellicle inspection device such as a pellicle particle detector ("PPD"). Further, second reticle handler 90 may include two or more reticle handling arms (not shown) that are in operate communication with a reticle carrier (described below) to facilitate the transfer of reticle 26 to inspection station 96 or reticle stage 20.

Figure 3A:
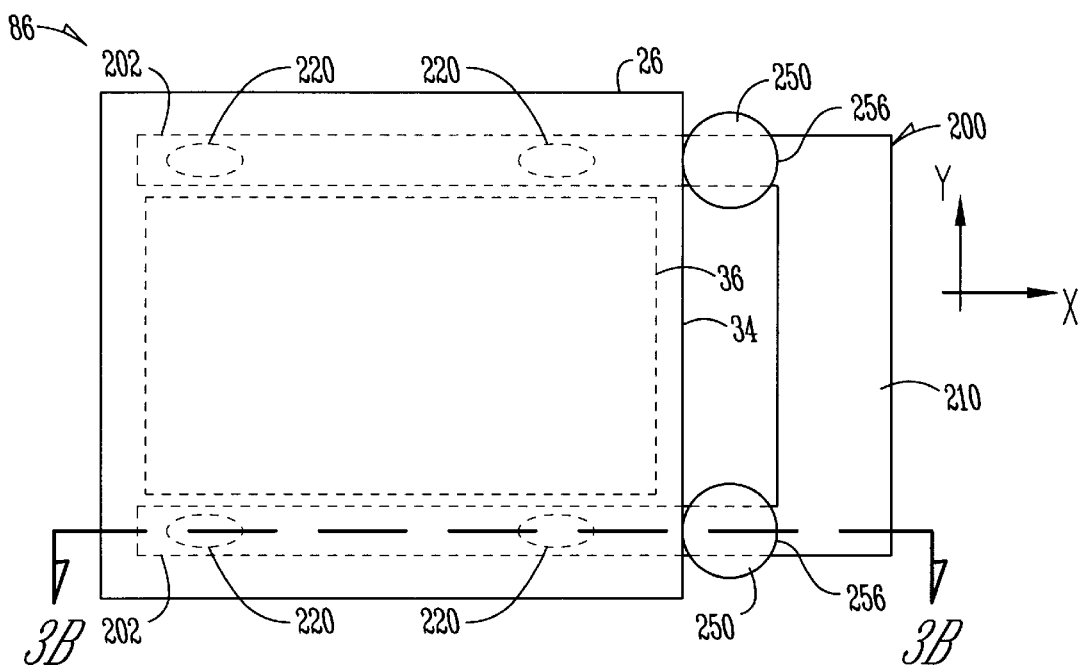
FIG. 3A is a plan view of an exemplary two-support-arm reticle handling arm as part of the first reticle handler of FIG. 2, showing a reticle supported by the two support arms and a reticle stop block on each support arm, wherein the reticle stop blocks serve to place the reticle at a desired position on the support arms.
Figure 3B:
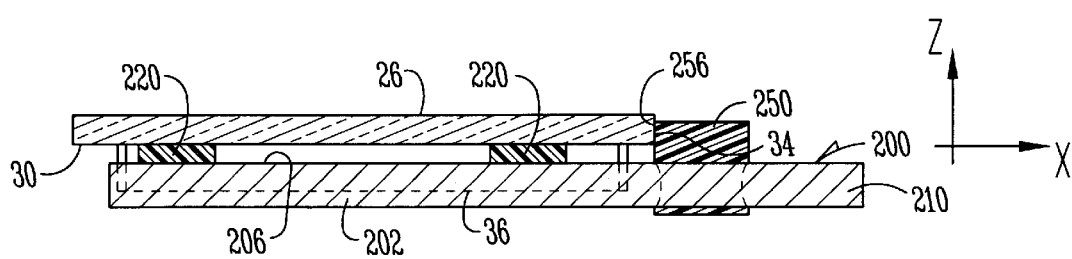
FIG. 3B is a cross-sectional view of FIG. 3A taken along the line 3B—3B.

With reference now to FIGS. 3A and 3B, first reticle handler 86 includes, in an example embodiment, a reticle handling arm 200 having two spaced apart elongate support arms ("arms") 202 each having an upper surface 206. Arms 202 extend horizontally outwardly from a base portion 210 and are preferably parallel and spaced apart by a distance sufficient to accommodate pellicle 36 between them when reticle 26 is engaged, recieved and supported. In an exemplary embodiment, arms 202 and base portion 210 are flat so that reticle handling arm 200 can be easily inserted into cassette 82 in reticle library 80 and other areas of reticle handling system 70.

Base portion 210 is connectable to a motor assembly (not shown) included as part of first reticle handler 86 and that provides the necessary movement of arm 200 for reticle handling. Vacuum lands 220, connected to respective vacuum lines (not shown), are included on upper surface 206 of each arm 202 and are used to secure reticle 26 to arm 200 by providing a vacuum seal to select areas of reticle lower surface 30 once the reticle is arranged in a desired position on the handling arm. In an exemplary embodiment of the present invention, handling arm 200 is made of aluminum and vacuum lands 220 are made of teflon or conductive plastic.

With continuing reference to FIGS. 3A and 3B, reticle handling arm 200 also includes one or more reticle stop blocks 250 each having a side edge 256. In an example embodiment, two reticle stop blocks 250 are used, with one stop block fixed to each arm 202 near base portion 210. Reticle stop block 250 is, in an example embodiment, made of an electrostatic dissipative material such as a polymer, e.g., polypropylene, polystyrene, polysilicon, polytetrafluoroetylene ("TEFLON"), etc.

With reference now to FIG. 3C, in another example embodiment of the present invention, a single reticle stop block 250 may be attached to base portion 210 between arms 202, with a portion of the block extending outward to a fixed distance in the direction parallel to arms 202. Reticle stop block 250 in this example embodiment may be formed from a block of material, such as a block of polymer, or machined from stock, such as polymer stock. Reticle stop block 250 is then affixed to base portion 210 by a set screw, adhesive or other known affixing techniques so that side edge 256 engages reticle edge 34 to define a desired position of the reticle on reticle handling arm 200.

With reference now to FIGS. 4A and 4B, an exemplary reticle stop block 250 of the present invention is shown. A preferred method of forming reticle stop block 250 of FIGS. 4A and 4B involves slicing a section (e.g., about 0.5") of 3/8" polymer ("poly") rod stock and forming a threaded bore 260 through the centerline 264. The method further includings forming a through bore 270 through side edge 256, the bore being sized to accommodate arm 202 and vacuum lands 220, if present. A set screw 272 is then used to fix the position of reticle stop block 250 on arm 202 once the block is slid over the arm and positioned in the desired location along the arm. The desired location is that which results in the reticle residing in a desired position on arms 202 after being engaged by reticle handling arm 200, as discussed further below.

It will be apparent to one skilled in the art that any number of techniques, such as the use of adhesives, can be used to fix reticle stop block 250 to arm 200. Moreover, reticle stop block can be essentially any geometrical shape. In an example embodiment, reticle stop block 250 has a height H that is less than the thickness of reticle 26 so that the reticle stop block does not protrude above upper surface 28 of reticle 26, to ensure proper clearance when loading and unloading reticles to and from cassette 82 in reticle library 80 (FIG. 2B).

With reference again to FIGS. 3A and 3B and also to FIGS. 2A and 2B, when a particular reticle 26 needs to be loaded onto reticle stage 20 of photolithography tool 12, reticle handling arm 200 is inserted into open side 84 of library 80 and into cassette 82 to engage and receive the reticle.

In the absence of reticle stop block(s) 250, the x-position of reticle 26 on reticle handling arm 200 may, in some reticle handling systems, be dictated by the position of reticle 26 in cassette 82. Thus, if a reticle is not fully inserted into cassette 82 or is otherwise not properly arranged therein, the x-position of the reticle on the reticle handling arm will not be correct, i.e., will not be located at the desired position. The desired position, as mentioned above, is one that allows for the successful transfer of the reticle from first reticle handling system 86 to second reticle handling system 90. Arrangement of the reticle in a position other than the desired position can result in a faulty transfer of the reticle from first reticle handling system 86 to second reticle handling system 90, with the negative consequences mentioned above and illustrated in FIG. 1 with respect to the prior art reticle handling system.

Accordingly, in the present invention one or more reticle stop blocks 250 are positioned on reticle handling arm 200 such that when the reticle handling arm is inserted into cassette 82 to engage reticle 26, reticle edge 34 makes contact with side edge 256 of the one or more stop blocks. This moves (e.g., pushes) the reticle to a desired x-position on arms 202, the desired position being selected to ensure successful transfer of the reticle to second reticle handler 90, as described below. If reticle 26 is properly positioned in cassette 82, then reticle edge 34 will not touch side edge 256 of the one or more reticle stop blocks 250 during reticle engagement as the reticle adopts the desired position without the assistance of the one or more reticle stop blocks.

Figure 5A:
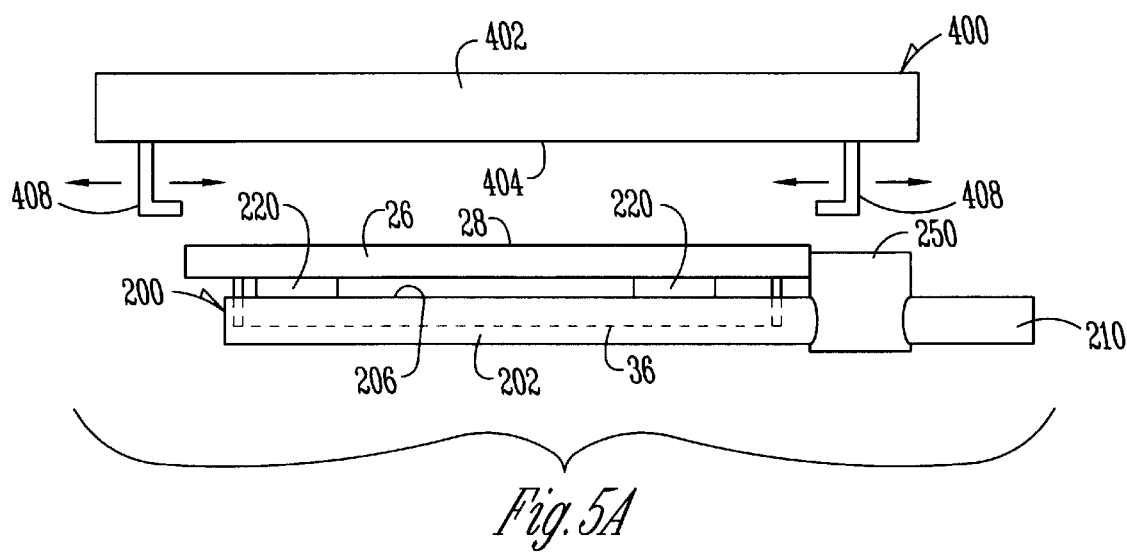
FIG. 5A is a side view of the reticle handling arm and the exemplary reticle stop block of FIGS. 4A and 4B prior to the reticle being engaged by the translatable lifting brackets of a reticle carrier.
Figure 5B:
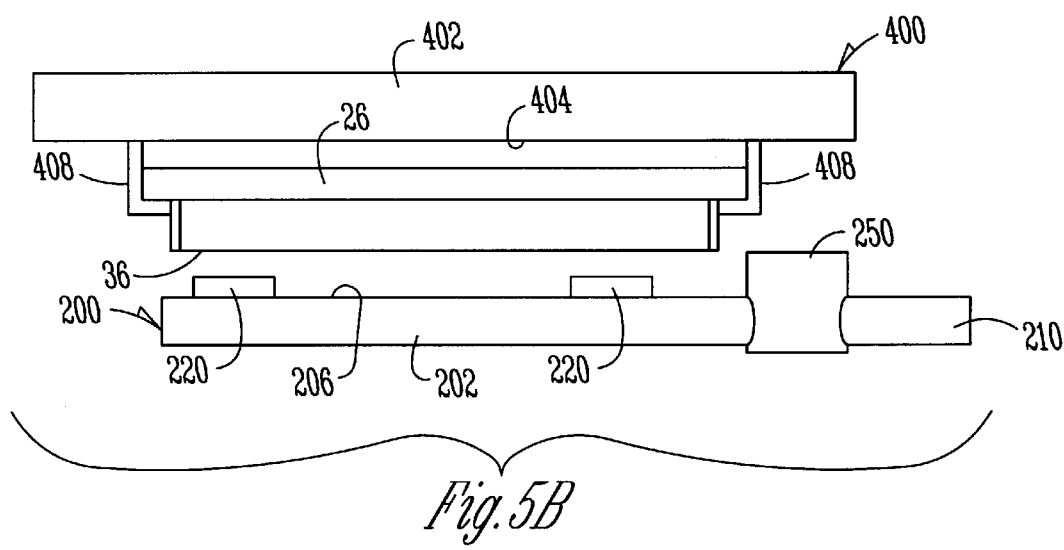
FIG. 5B is the same side view as FIG. 5A subsequent to the reticle being successfully engaged and lifted by the translatable lifting brackets of the reticle carrier, in contrast to the prior art faulty reticle transfer due to reticle misplacement on the reticle handling arm as illustrated in FIG. 1.

With reference now to FIGS. 5A and 5B, once reticle 26 is properly loaded onto reticle handling arm 200, the arm transports the reticle to second reticle handler 90. The latter includes a reticle carrier 400 having a platen 402 that is connectable to a motor assembly (not shown) included as part of second reticle handler 90 and that provides the necessary movement of reticle carrier 400 for reticle transfer. Platen 402 has a lower surface 404 from which extends opposing translatable lifting brackets 408 (also called "fingers"). Lifting brackets 408 are designed to separate (open) to capture reticle 26 and then close to engage the captured reticle so that it can be lifted from reticle handling arm 200.

Figure 1:
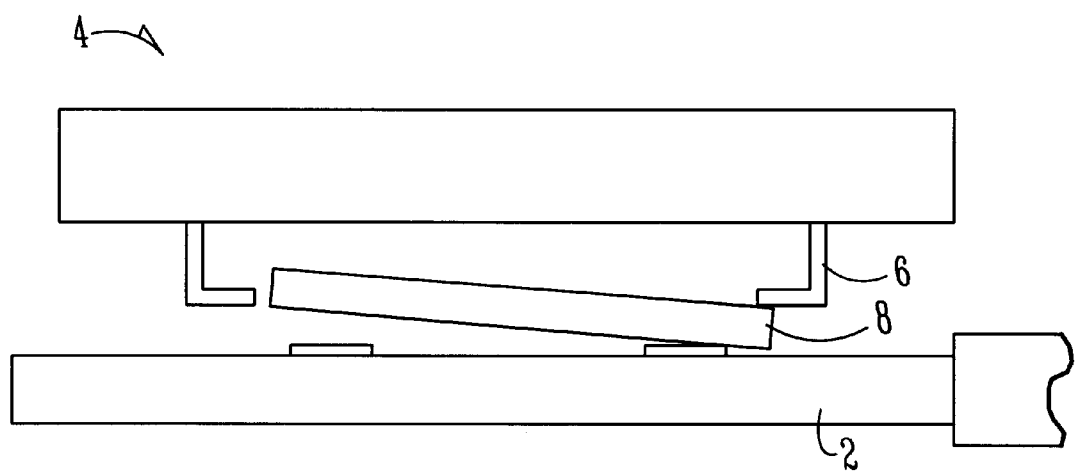
FIG. 1 is a schematic side view of a prior art reticle handling system having a first reticle handling arm and a reticle carrier with translatable lifting brackets, illustrating how incorrect positioning of the reticle on the reticle handling arm can result in a reticle handling fault, such as a jammed reticle as shown.

Again, in the absence of reticle stop blocks 250, there is a chance that a misalignment of the reticle on reticle handling arm 200 relative to the desired position will cause fingers 408 to forceably contact the reticle, (e.g., jam into upper surface 28, as shown in FIG. 1) and damage the reticle and/or cause a reticle jam.

Once reticle 26 is properly transferred to reticle carrier 400, the reticle is then carried by the reticle carrier over to a second location. The second location may be, for example, reticle stage 20 in photolithography 12. Alternatively, the second location may be inspection station 96, such as a pellicle inspection device (e.g., a PPD), and then moved to reticle stage 20 after inspection. The reticle, once positioned in reticle stage 20, is then exposed by photolithography tool 12 to pattern substrate 60 in the formation of a microdevice, as described above in connection with FIG. 2.

In an alternative embodiment, reticle handling arm 200 transports reticle 26 to inspection station 96. This is accomplished by reticle arm 200 delivering reticle 26 to reticle carrier 400. The vacuum applied via vacuum lands 220 is then released so that reticle 26 is free to move relative to arms 202. Fingers 408 of reticle carrier 400 are then positioned about reticle 26 and closed. This accurately positions reticle 26 on reticle handling arm 200 prior to the reticle being delivered to the inspection station by the reticle handling arm. Again, if proper initial alignment of reticle 26 on reticle handling arm 200 is not achieved prior to the fine alignment performed by reticle carrier 400, then there is the aforementioned risk of damage to the reticle when engaged by the reticle carrier.

CONCLUSION

The present invention includes apparatus and methods that utilizes one or more reticle stop blocks in the automated handling of reticles. The one or more reticle stop blocks are positioned on a reticle handling arm for ensuring the proper positioning of a reticle thereon. Such positioning ensures the successful transfer of the reticle from the reticle handling arm to a reticle carrier so that the reticle can be successfully loaded into a photolithography tool. The use of reticle stop blocks will, for certain reticle handling systems, result in a reduced likelihood of reticle handling faults, which can damage the reticle and/or jam the reticle handling system or phototool, and which can also stop the manufacturing process. The present invention offers a simple and elegant solution to the problem of faulty reticle handling in certain reticle handling systems used in conjunction with photolithography tools.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A reticle handling arm apparatus for handling a reticle, comprising:
    a base portion;
    two spaced apart support arms extending outwardly from the base portion for engaging a lower surface of the reticle; and
    two reticle stop blocks not extending beyond an upper surface of the rectile, wherein one recticle stop block is fixed to each support arm near the base portion, further wherein the two rectile stop blocks are positioned to passively engage an edge of the reticle so as to assure accurate placement of the reticle in a desired position on the support arms.

2. The apparatus of claim 1, wherein the support arms are spaced apart so as to accommodate a pellicle attached to the reticle.

3. The apparatus of claim 1, wherein the support arms include one or more vacuum lands for securing the recticle to the reticle handling arm apparatus.

4. The apparatus of claim 1, wherein the recticle stop blocks are formed from an electrostatic dissipative material.

5. The apparatus of claim 1, wherein the reticle stop blocks are fixed to the support arms using one or more set screws.

6. The apparatus of claim 1, wherein the reticle handling arm apparatus is a first reticle handling arm apparatus and a second reticle handling arm apparatus is in operative communication with the first reticle handling arm apparatus to engage and receive a reticle from the first reticle handling arm apparatus.

7. The apparatus of claim 6, wherein the second reticle handling arm apparatus includes a reticle carrier having translatable lifting brackets adapted to engage the reticle when the reticle resides on the first reticle handling arm apparatus.

8. The apparatus of claim 6, further including a reticle library capable of containing a plurality of reticles to be engaged and received by the first reticle handling arm apparatus.

9. A method of receiving a reticle in a desired position on a reticle handling arm of a reticle handler, comprising:
    providing two reticle stop blocks for the reticle handling arm, the reticle handling arm having two spaced apart support arms; and
    fixing one reticle stop block to each support arm so as to passively engage an edge of the reticle to define a desired position on the reticle handling arm.

10. The method of claim 9, further including engaging the reticle with a second reticle handler.

11. The method according to claim 10, further including transferring the reticle to a reticle stage of a photolithography tool with either the reticle handling arm or the second reticle handler.

12. The method of claim 10, further comprising transferring the reticle to an inspection station.

13. The method of claim 11, further comprising forming an image of the reticle onto a substrate using the photolithography tool.

14. The method of claim 9, wherein the support arms are spaced apart so as to accommodate a pellicle attached to the reticle.

15. The method of claim 9, wherein the support arms include one or more vacuum lands for securing the recticle to the reticle handling arm.

16. The method of claim 9, wherein the reticle stop blocks are formed from an electrostatic dissipative material.

17. The method of claim 9, wherein the reticle stop blocks are fixed to the support arms using one or more set screws.

* * * * *